United States Patent [19]

Gilles et al.

[11] 4,387,277
[45] Jun. 7, 1983

[54] FOUR WIRE TO TWO WIRE CONVERTER

[75] Inventors: Bernard Gilles; Jose A. Paulet; Raphaël J. S. Roux, all of Colombes, France

[73] Assignee: Thomson-CSF Telephone, Colombes, France

[21] Appl. No.: 245,976

[22] Filed: Mar. 20, 1981

[30] Foreign Application Priority Data

Mar. 21, 1980 [FR] France .................. 80 06401

[51] Int. Cl.$^3$ ........................... H04B 1/58
[52] U.S. Cl. .............................. 179/170 NC
[58] Field of Search ........ 179/18 FA, 170 T, 170 NC

[56] References Cited

U.S. PATENT DOCUMENTS

| 3,970,805 | 7/1976 | Thomas | 179/170 NC |
| 4,039,766 | 8/1977 | Picandet | 179/170 NC |
| 4,041,252 | 8/1977 | Cowden | 179/170 NC |
| 4,292,479 | 9/1981 | Chataignon et al. | 179/170 NC |

FOREIGN PATENT DOCUMENTS

| 2305080 | 10/1976 | France | 179/170 NC |
| 2361025 | 3/1978 | France | 179/170 NC |
| 2437116 | 4/1980 | France | . |

OTHER PUBLICATIONS

D. Fisk & M. Homan, "Balanced Electronic Hybrid Circuits," IBM Technical Disclosure Bulletin, vol. 16, No. 2, Jul. 1973, pp. 495-496.
Y. Morikawa, "Fully Electronic TD-PABX Techniques," IEEE International Conf. on Private Electronic Switching Systems, Apr. 1978, pp. 142-147.

Primary Examiner—G. Z. Rubinson
Assistant Examiner—Randall P. Myers
Attorney, Agent, or Firm—Cushman, Darby & Cushman

[57] ABSTRACT

The connecting device according to the present invention comprises for a two wire to four wire converter which connects the reception channel of a private network to the public network via an amplifier, whose symmetrical outputs are connected to the public network by capacitors, the gain loss due to these capacitors being compensated by a second amplifier. For the transmission channel a third amplifier has inputs connected to the public network by capacitors and an output connected to one input of a fourth amplifier, whose other input is connected by a phase shifting network to the reception channel.

2 Claims, 1 Drawing Figure

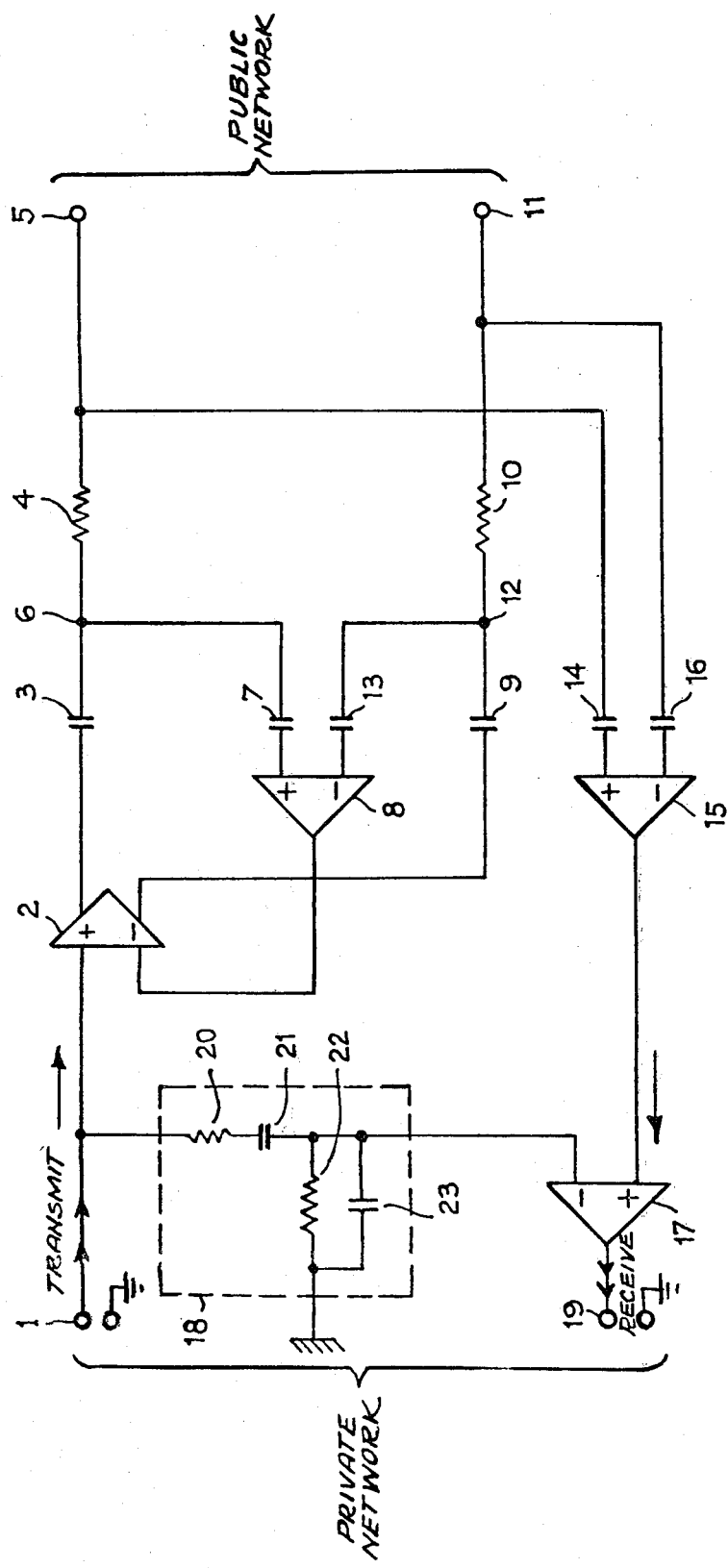

FOUR WIRE TO TWO WIRE CONVERTER

BACKGROUND OF THE INVENTION

1. Field of the Invention

The present invention relates to a two wire to four wire converter device for connecting a private telephone network to the public telephone network.

2. Description of the Prior Art

Hitherto the electrical isolation of a connecting device between a private telephone network and a public telephone network was generally in the form of a transformer, whereof one winding was connected to the private network and the other to the public network via a high capacitance capacitor arranged in series with said winding.

This known connecting device has a number of disadvantages as a result of the relatively high cost of the transformer used, the brittleness of the ferrite of this transformer and the overall dimensions of the transformer and capacitor, which must have a high capacitance as stated hereinbefore.

The present invention relates to a connecting device of the aforementioned type, whose cost and overall dimensions are significantly reduced compared with the known devices and which is no more fragile or brittle than they are.

SUMMARY OF THE INVENTION

The connecting device according to the invention comprises for the transmission channel to the public network a first operational amplifier, whereof one input is connected to the reception channel from the private network and whereof each of the two outputs in phase opposition is connected by an electrically insulating capacitor in series with a resistor of appropriate value to one of the two wires of the public network, and for the transmission channel a second operational amplifier, whereof each of the two inputs is connected to one of the two wires of the public network by an electrically insulating capacitor.

According to another embodiment of the present invention another input of the first operational amplifier is connected to the output of a third operational amplifier, whereof each of the two inputs is connected by a capacitor to the common point of the capacitor and the resistor arranged in series at the output of the first operational amplifier. The gain of the third operational amplifier is advantageously ½ when the sum of the said resistors is equal to the resistance of the public network with respect to the connecting device.

According to another embodiment of the present invention the output of the second operational amplifier is connected to the non-inverting input of a fourth operational amplifier, whereof the inverting input is connected via a phase shifting network to the reception channel from the private network, the phase shift of the phase shifting network being equal to the total phase shift between the input of the first operational amplifier connected to the private network and the output of the second operational amplifier.

BRIEF DESCRIPTION OF THE DRAWING

The present invention will be better understood from the following detailed description of an embodiment in a non-limitative, exemplified form and illustrated by the attached drawing, which is a diagram of said embodiment.

DETAILED DESCRIPTION

In the drawing the transmission wire of the automatic switch of the not shown private network leads to a terminal 1. Terminal 1 is connected to a non-inverting input of a first operational amplifier 2 of the type having symmetrical outputs, whereof a first output is connected via a capacitor 3 in series with a resistor 4 to a terminal 5, itself connected to one of the two wires of the hot shown public network. The common point 6 of capacitor 3 in resistor 4 is connected by a capacitor 7 to a non-inverting input of a second operational amplifier 8, whose output is connected to a second inverting input of operational amplifier 2. The second output of the operational amplifier 2 is connected via a capacitor 9 in series with a resistor 10 to a terminal 11, itself connected to the second wire of the public network.

The common point 12 of capacitor 9 and resistor 10 is connected by a capacitor 13 to a second inverting input of operational amplifier 8.

Terminal 5 is connected via a capacitor 14 to the non-inverting input of a third operational amplifier 15 and terminal 11 is connected to a second inverting input of operational amplifier 15 via a capacitor 16. The output of operational amplifier 15 is connected to the non-inverting input of a fourth operational amplifier 17, whose inverting input is connected via a phase shifting network 18 to terminal 1. The output of operational amplifier 17 is connected to a terminal 19, itself connected to the not shown reception wire of the private network.

In the embodiment shown in the drawing the phase shifting network 18 comprises between its input and its output a series circuit constituted by a resistor 20 in series with a capacitor 21, whereof the terminal connected to the output of said network is also connected to earth by a parallel circuit comprising a resistor 22 and a capacitor 23. However, it is obvious that numerous other known phase shifting networks can be suitable if they lead to an appropriate phase shift in the frequency band in question and if their phase shift can be easily adjusted.

An explanation will now be given of the connecting device described hereinbefore, firstly in the transmission phase to the public network and secondly in the reception phase from the public network.

In the transmission phase Ve is the signal transmitted by the automatic switch of the private network and which reaches terminal 1. Signal Ve, amplified by amplifier 2, appears in phase on one of its outputs, for example that connected to capacitor 3, and in phase opposition on the other output.

As the resistance of the public network with respect to terminals 5 and 11 is R, the resistors 4 and 10 will advantageously in each case be selected equal to R/2. In general R=600Ω, so that the resistances of resistors 4 and 10 are preferably equal to 300Ω in each case. Signal Ve must have the same amplitude at the input of the connecting device (on terminal 1) as at the output (between terminals 5 and 11). Due to the fact that the circuit formed by resistors 4 and 10 on the one hand and the resistance with respect to terminals 5 and 11 on the other is a divider by two, a signal of value 2Ve is obtained between points 6 and 12 for a signal Ve on terminal 1.

As the operational amplifier 8 is selected to be of the type with a very high input impedance, capacitors 7 and 13 can have relatively low values (100 nF or lower) and if the gain of amplifier 8 is equal to ½ the signal at its output has a value Ve. Thus, each of the inputs of amplifier 2 receives a signal of value Ve. The gain of amplifier 2 is adjusted in such a way that by means of the correction provided by amplifier 8 the signal between points 6 and 12 always has the value 2Ve for a signal of value Ve applied to terminal 1, taking account attenuation due to capacitors 3 and 9. Capacitors 3 and 9 ensure the electrical isolation of amplifier 2 from the public network. In the same way capacitors 7 and 13 electrically isolate amplifier 8 from the said public network.

In an embodiment in which capacitors 3, 7, 9 and 13 all had a value of 100 nF an amplitude variation of approximately ±0.1 dB was measured for the signal between terminals 5 and 11 in the case of a constant input signal, this being in the frequency band 300 to 3400 Hz.

Signal Ve present between terminals 5 and 11 is transmitted by electrically isolating capacitors 14 and 16 to operational amplifier 15. As amplifier 15 with a gain equal to 1 can be chosen with a very high input impedance, capacitors 14 and 16 can have relatively low values, e.g. 100 nF or lower. Thus, these capacitors 14 and 16 lead to virtually no amplitude distortion as a function of frequency in the transmitted frequency band. Thus, signal Ve is obtained at the output of amplifier 15 and consequently at the non-inverting input of amplifier 17. Moreover signal Ve reaching terminal 1 is phase-shifted by an angle $\phi$ by the phase shifting network 18 and in this form is applied to the inverting input of amplifier 17. If the phase shift $\phi$ supplied by the phase shifting network 18 is equal to the phase shift affecting signal Ve appearing at the output of 15, no signal due to Ve appears at the output of amplifier 17, because the public network supplies no signal to terminals 5 and 11. Thus, there is no transmission signal return to the reception channel. In the embodiment referred to hereinbefore the values of components 20 to 23 of the phase shifting network 18 being respectively 65kΩ, 47 nF, 79kΩ and 470 pF a return voltage whose level was always at least 12 dB below the level of the signal applied to the terminal 1 was measured for the same frequency band.

In the reception phase, as signal Ve is zero, it is assumed that the public network produces a signal V at terminals 5 and 11. Signal V occurs again at the output of amplifier 15 with substantially no attenuation and is applied to the non-inverting input of amplifier 17. As signal Ve is zero, as stated hereinbefore, the inverting input of amplifier 17 receives no signal. Therefore only signal V appears at terminal 19.

If appropriate the common-mode rejection of interference from the public network can be improved by replacing amplifier 15 by a suitable known circuit.

The connecting device according to the present invention thus makes it possible to ensure a good separation of the transmission and reception channels, whilst having smaller overall dimensions, being less costly and less fragile than the known devices. The electrically isolating capacitors can be of a low value and certainly below that of the capacitor of the prior art circuit referred to hereinbefore.

What is claimed is:

1. A two wire to four wire converter for connecting a private telephone network having a transmission and reception channel to a public telephone network and isolating the networks with low value capacitors comprising:

a first operational amplifier having first and second inputs with one input connected to said reception channel and first and second symmetrical outputs;

two circuit branches each comprising a serially connected isolating sigular and a singular each branch respectively connecting one of said outputs of said first amplifier to said public network;

a second operational amplifier having first and second inputs and an output;

two isolating capacitors each respectively connecting one of said inputs of said second amplifier to said public network;

a third operational amplifier having first and second inputs and an output connected to the other input to said first amplifier said third amplifier having a gain of ½ when the sum of the series resistances is equal to the resistance of the public network with respect to the converter;

two isolating capacitors respectively connecting the common points of the series connected resistors and capacitors to said first and second inputs of said third amplifier;

a fourth operational amplifier having first and second inputs with a first input connected to the output of said second amplifier and an output connected to said transmission channel; and a phase shifting network connected between said reception channel and said second input of said fourth amplifier.

2. A connecting device according to claim 1, wherein the phase shifting network comprises a series circuit comprising a resistor and a capacitor, said series circuit being followed by a parallel shunt circuit comprising a resistor and a capacitor and wherein the values of the components of the series circuit and the parallel circuit are respectively 65k$\phi$, 47 nF, 79k$\phi$, and 470 pF.

* * * * *